United States Patent [19]

Hisano

[11] Patent Number: 5,165,011
[45] Date of Patent: Nov. 17, 1992

[54] SYSTEM FOR SWITCHING A RULE GROUP

[75] Inventor: Atsushi Hisano, Nagaokakyo, Japan

[73] Assignee: Omron Tateisi Electronics Co., Kyoto, Japan

[21] Appl. No.: 745,968

[22] Filed: Aug. 12, 1991

Related U.S. Application Data

[63] Continuation of Ser. No. 410,270, Sep. 21, 1989, abandoned.

[30] Foreign Application Priority Data

Sep. 22, 1988 [JP] Japan .................. 63-238372

[51] Int. Cl.⁵ .................. G06F 9/44; G06F 15/18
[52] U.S. Cl. ........................ 395/54; 395/51; 395/61; 395/11
[58] Field of Search .............. 395/11, 53, 61, 51, 395/54

[56] References Cited

U.S. PATENT DOCUMENTS

| | | | |
|---|---|---|---|
| 4,754,409 | 7/1988 | Ashford et al. | 364/513 |
| 4,809,219 | 2/1989 | Ashford et al. | 364/900 |
| 4,868,763 | 9/1989 | Masui et al. | 364/513 |

FOREIGN PATENT DOCUMENTS

| | | |
|---|---|---|
| 63-98741 | 4/1988 | Japan . |
| 63-11159 | 5/1988 | Japan . |
| 63-233433 | 9/1988 | Japan . |
| 1274243 | 11/1989 | Japan . |

OTHER PUBLICATIONS

Knight B. et al., "The Use of Expert Systems in Industrial Control", *Measurement and Control*, vol. 17, Dec./-Jan. 1984/1985, pp. 409–413.

Lemke, H. R. et al., "Fuzzy Pid Supervisor", *Proceedings of the 24th IEEE Conference on Decision and Control*, vol. 1, pp. 602–608.

Leung, K. S. et al., "Applications of a Novel Fuzzy Expert System Shell", *Expert Systems*, vol. 6, No. 1, Feb. 1989, pp. 2–10.

*Primary Examiner*—Allen R. MacDonald
*Attorney, Agent, or Firm*—Dickenstein, Shapiro & Morin

[57] ABSTRACT

A system is disclosed for switching a selected one out of a plurality of rule groups to an inference device which operates on applied input data using the selected rule group. A starting rule group decision unit receives the input data and decides on a starting rule group to be used by the inference device on the received input data. During operation, the selecting unit may designate another rule group to be activated for use by the inference device. The plurality of rule groups are preferably associated with respective rule group processors each having a plurality of rule evaluation units, the starting rule group decision unit decides on one of the rule group processors used in the inference device, and the selecting unit includes a plurality of switching gates respectively assigned to the rule group processors so that a rule group processor is selected for use by activating its assigned switching gates.

24 Claims, 10 Drawing Sheets

FIG. 9

| STEP | COMMAND |
|------|---------|
| 001 | SET 1,1 |
| 002 | SET 2,2 |
| 003 | SET 3,3 |
| 004 | SET 4,4 |
| 005 | ENABLE 1 |
| 006 | if (DIST(A,A₀₀)<θ) then GOTO 009 |
| 007 | if (DIST(A,A₁₀)<θ) then GOTO 013 |
| 008 | GOTO 006 |
| 009 | ENABLE 2 |
| 010 | TIMER 0 |
| 011 | if (TIMER≧T₀) then GOTO 001 |
| 012 | GOTO 011 |
| 013 | SET 5,2 |
| 014 | SET 6,3 |
| 015 | SET 7,4 |
| 018 | ENABLE 2 |
| 019 | if (DIST(A,A₂)<θ) then GOTO 001 |
| 020 | GOTO 019 |

SYSTEM FOR SWITCHING A RULE GROUP

This application is a continuation of application Ser. No. 07/410,270, filed Sep. 21, 1989 now abandoned.

BACKGROUND OF THE INVENTION

1. Field of the Invention

This invention relates to a system for switching a starting rule group in an inference system such as a fuzzy computer employing fuzzy rules.

2. Discussion of the Related Art

In a conventional inference system such as a fuzzy inference computer, only the rule group initially set is always activated. The rule group is constituted with many rules sharing a role to implement a control subject, or with a fuzzy rule group in the fuzzy inference computer.

Accordingly, the conventional inference system such as the fuzzy inference computer has the following disadvantages:

(1) A control subject cannot be changed in real time according to a change of a status of an object to be controlled by the conventional inference system, so that the control subject cannot be changed into an emergency position if the object becomes subject to an emergency.

(2) It is difficult to implement a complicated operation by switching a starting rule group in accordance with a time sequential change of the control subject, which is implemented by a conventional sequence controller or robot controller.

SUMMARY OF THE INVENTION

It is, therefore, a primary object of this invention to provide a system for switching a starting rule group based on primary factor data for a change of a specified rule such as status or time sequential data about the object to be controlled so that rule groups can be changed in real time and any unpredicted change of the control subject can be followed by the system.

It is another object of this invention to provide a system for switching rule groups wherein the number by rule groups in use of the system can be expanded to the number of rule groups stored in a data base in addition to that of the rule groups stored in the system.

It is still another object of this invention to provide a system for switching rule groups by a user program supported by an interpreter so that the operation for such switching can be easily set or changed.

According to this invention, there is provided a system for switching rule groups which includes a starting rule group decision means for deciding a starting rule group by receiving primary factor data for change of a rule group, and a selecting means for selecting a rule group to be started and to produce an inference result thereby. As another aspect of this invention, there is provided a system for switching rule groups which includes a data base means for storing rule groups in group units and a rule group switching means for rewriting unactivated rule groups based on the data base means during the execution of an inference by the selected starting rule group.

BRIEF DESCRIPTION OF THE DRAWINGS

The above and other objects, advantages and features of this invention will be more fully understood from the following detailed description of the invention, taken in conjunction with the accompanying drawings, in which:

FIG. 9 is a table showing one example of a user program employed in the system.

DETAILED DESCRIPTION OF THE INVENTION

Figure 1:
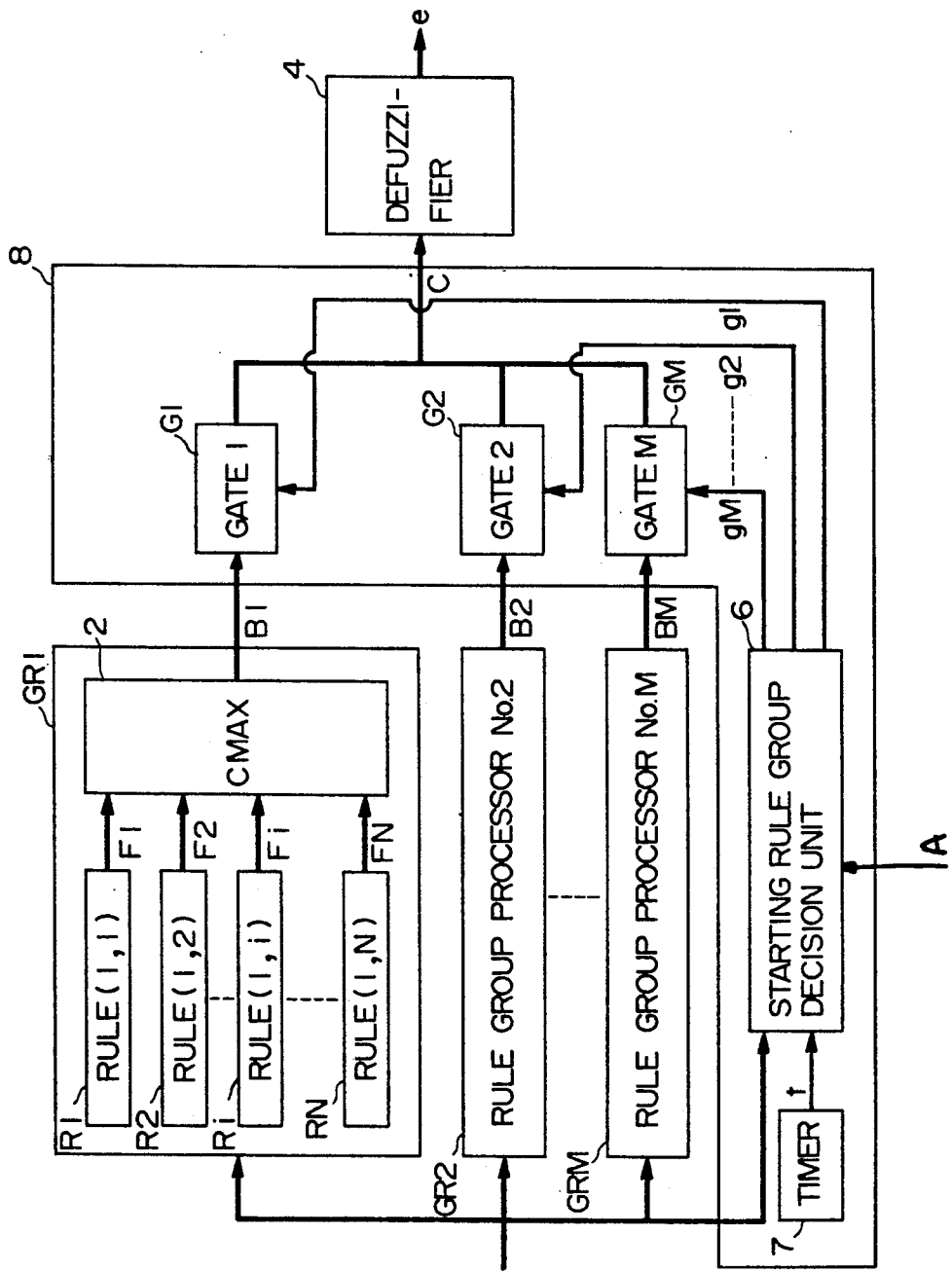
FIG. 1 is a schematic block diagram of a system including a fuzzy inference section storing fuzzy rule groups and a switching device for switching the fuzzy rules groups as a first embodiment of this invention.

Referring to FIG. 1, there is shown a first embodiment of a switching device 8 for switching fuzzy rule groups stored in a fuzzy inference section associated therewith according to this invention. The inference section in this embodiment employs a fuzzy computer as one example of this invention.

The switching device 8 is connected with "M" number of rule group processors GR1, GR2, ..., GRM, and a defuzzifier 4. Each rule group processor is designed to implement an inference just before a defuzzify operation by the defuzzifier 4, and has the same construction. For example, the rule group processor GR1 includes "N" number of fuzzy rule evaluation units R1, R2, ... Ri..., RN and a CMAX (corresponding MAX) circuit 2. The respective rule group processors GR1 to GRM are connected through gates G1, G2, ..., GM to defuzzifier 4 to produce a decided value e based on the membership functions produced from the rule group processors. A starting rule group decision unit 6 is disposed to decide a rule group to be started based on an external data A and an elapsing time t generated from a timer 7 and to control the gates G1 to GM. Thus, the decision unit 6, the timer 7 and gates G1 to GM constitute the switching device 8 of the fuzzy rule groups which decides the fuzzy rule to be started and switches the input applied to the defuzzifier.

Figure 2:
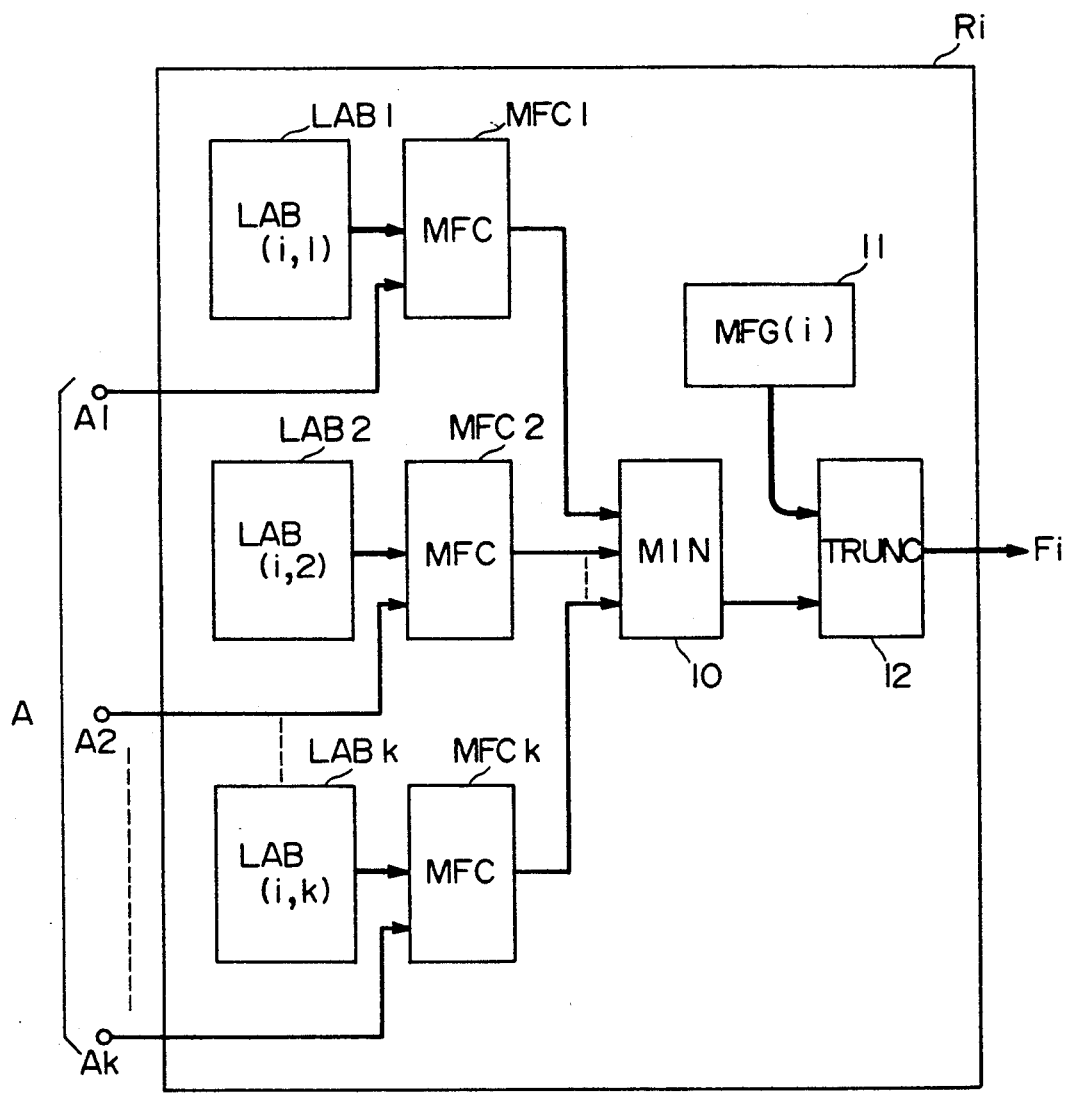
FIG. 2 is a schematic block diagram of a fuzzy rule evaluation unit employed in the fuzzy inference section of FIG. 1.

FIG. 2 shows a schematic block diagram of the fuzzy rule evaluation unit Ri of the rule group processor (No. 1) GR1. Other fuzzy rule evaluation units R1, R2 to RN in the unit GR1 and other units GR2 to GRM have the same constructions as that of FIG. 2. In FIG. 2, membership function circuits (MFC) MFC1, MFC2, ..., MFCk respectively receive inputs A1, A2, ..., Ak and fuzzy labels stored in fuzzy label registers LAB1, LAB2, ..., LABk to produce membership values for application to a MIN circuit 10 for computing the minimum value among the applied membership values. Thus, the MIN circuit 10 implements a fuzzy logic product at an antecedent of a fuzzy rule (i). A membership function generator 11 produces a membership function at a consequent of the fuzzy rule to be applied to a truncation circuit 12 which truncates the applied membership function above the output level produced from the MIN circuit 10.

Figure 3:
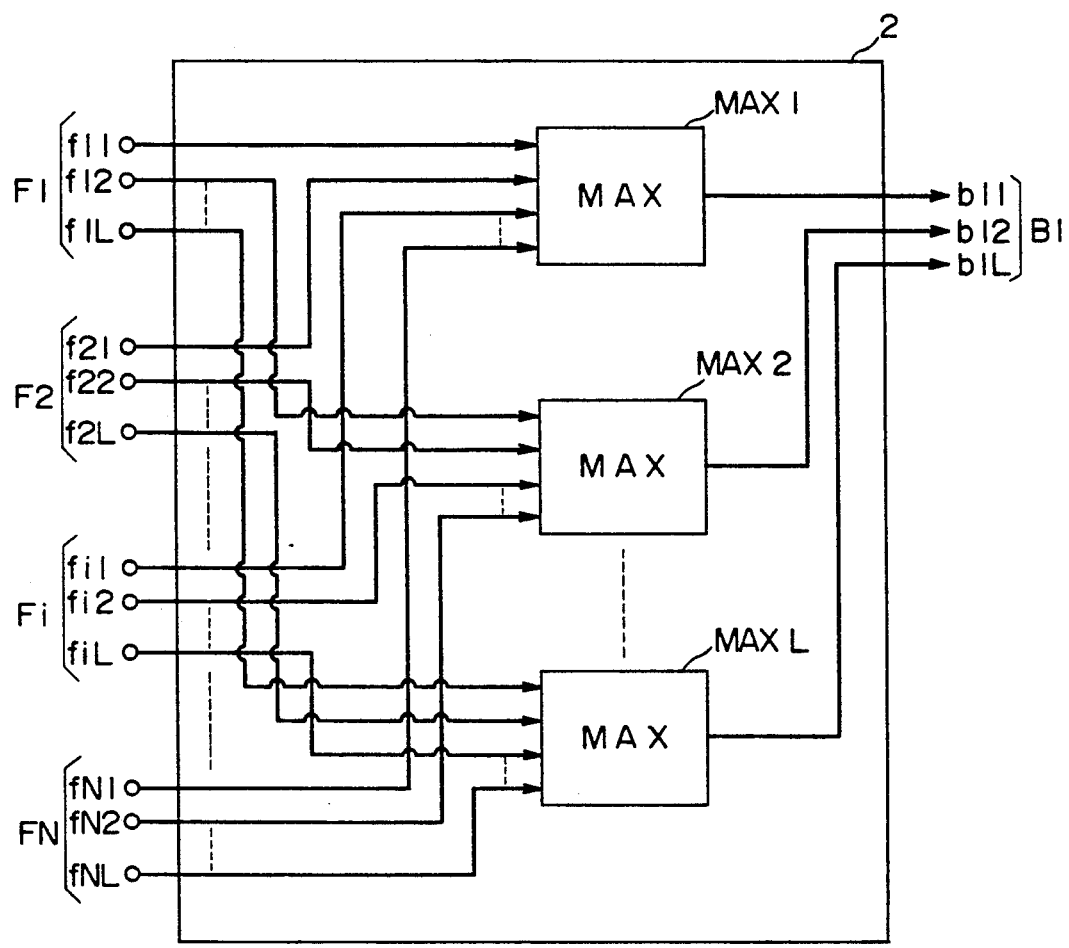
FIG. 3 is a schematic block diagram of a CMAX circuit employed in the fuzzy inference section.

Referring to FIG. 3 there is shown a block diagram of CMAX circuit 2 which synthesizes membership functions produced from the respective fuzzy rule evaluation units R1 to RN in each rule group processor. The respective MAX circuits MAX1, MAX2, ..., MAKL select the maximum values among the inputs from the fuzzy rule evaluation units.

Figure 4:
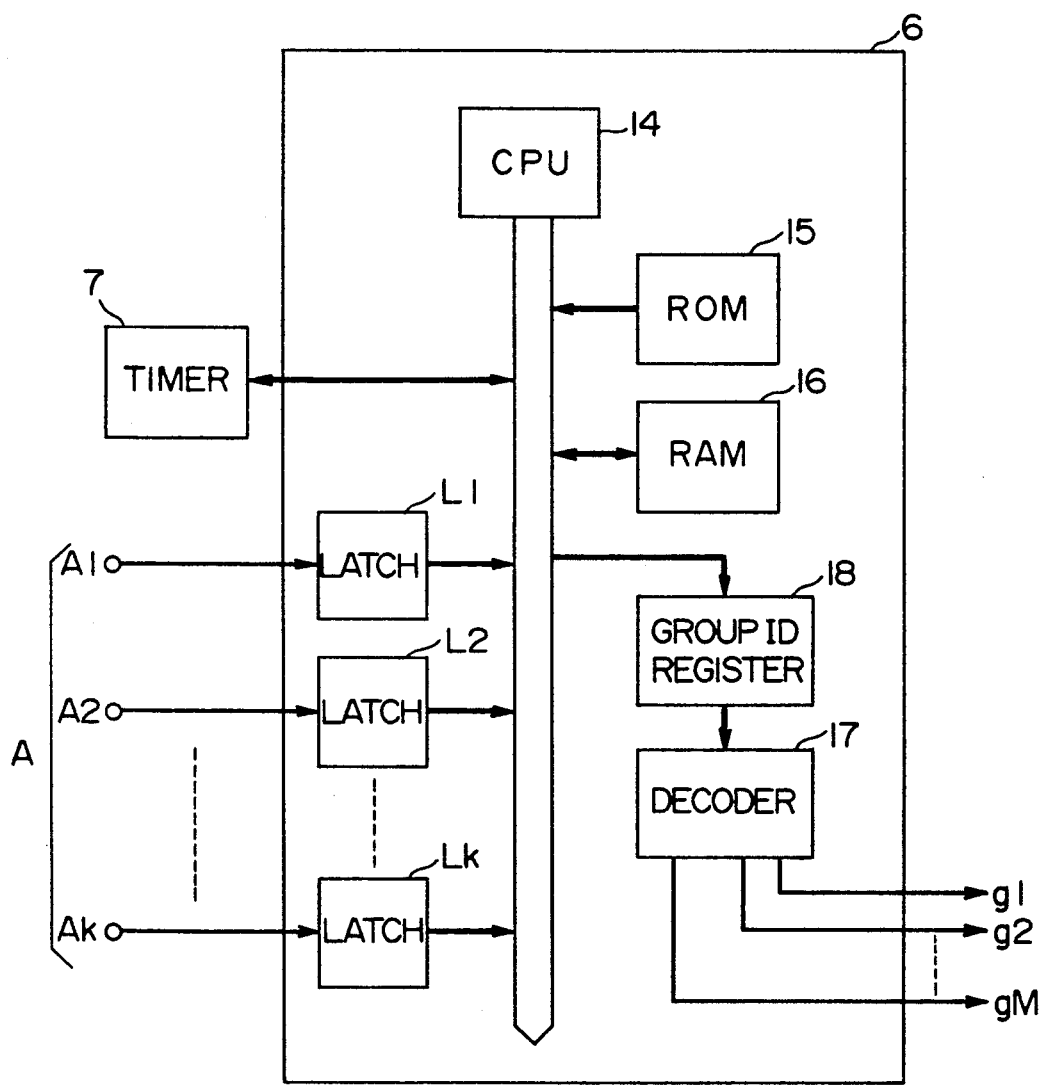
FIG. 4 is a schematic block diagram of a starting rule group decision unit employed in the switching device of FIG. 1.
Figure 5:
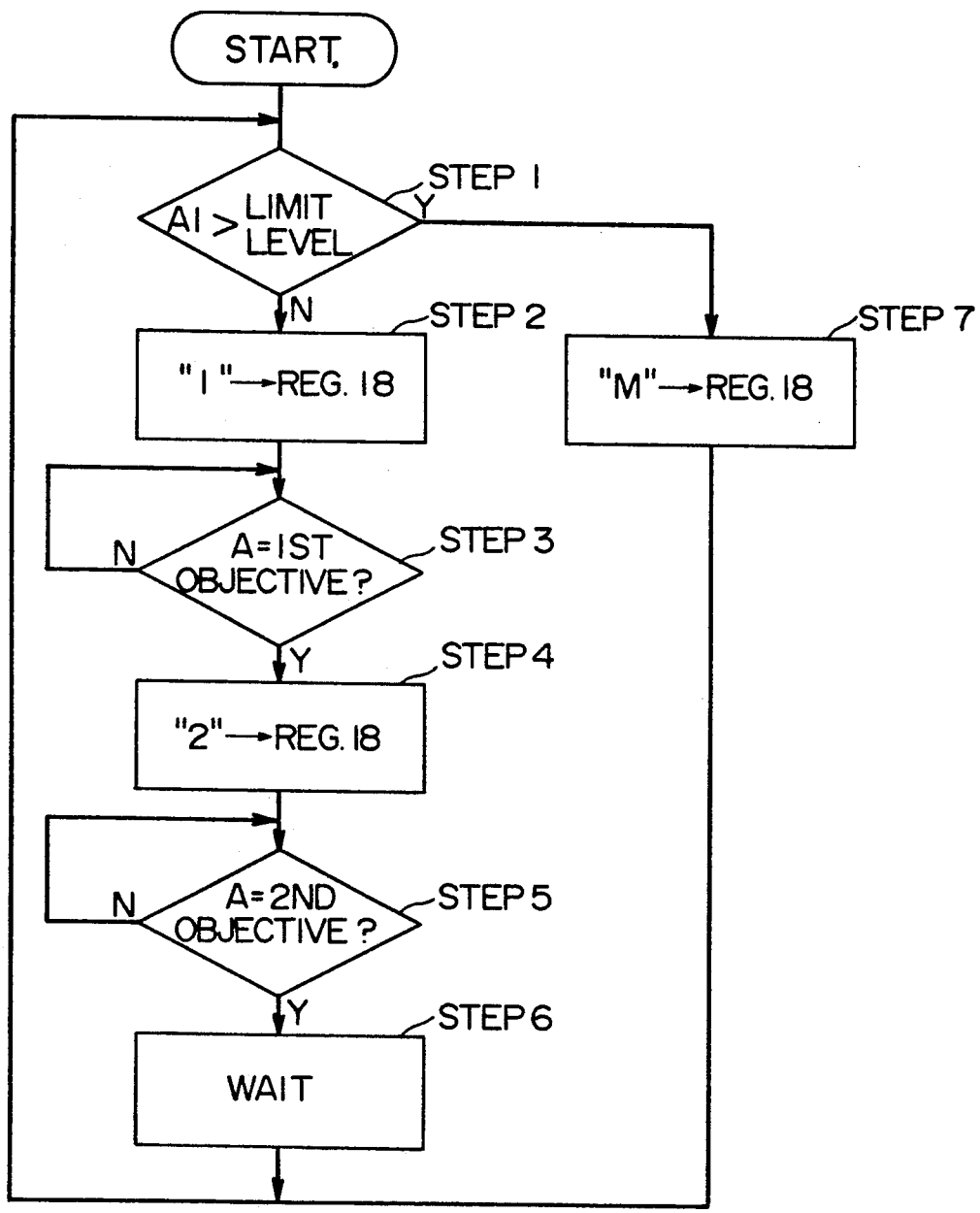
FIG. 5 is a flow chart executed by a CPU employed in the unit of FIG. 4.

In FIG. 4, there is shown a schematic block diagram of the starting rule group decision unit 6 including a CPU 14, a ROM 15 connected with CPU 14 through a bus for storing a program executed by the CPU, and a RAM 16 connected with the CPU through the bus for storing various data. Latch circuits L1, L2, ..., Lk are disposed to latch data A representing the status of an object to be controlled so as to be read by the CPU through the bus. A group ID register 18 is connected to the CPU through the bus so that the CPU 14 can write into the register 18 the identification of the rule group to be started. A decoder 17 for receiving the identification of the starting rule group produces switching signals to be applied to the gates G1, G2, ..., GM. FIG. 5 is a flow chart illustrating a flow by the CPU 14.

The operation by the system for switching rule groups in this embodiment will be described hereinafter in conjunction with FIGS. 1 to 5.

Referring to FIG. 5, there is shown a flow chart to decide a starting rule group by the starting rule group decision unit 6 receiving the external data A representing a status of the object to be controlled and the output t from the timer 7. In STEP1, the CPU 14 (FIG. 4) reads data A1 among the data A from the latch L1, and inquires whether or not the data A1 represents an emergency. If it is an emergency, viz. the data A1 is larger than a limit level, the sequence moves from STEP1 to STEP7 wherein the CPU 14 sets into the group ID register 18 an identification "M" of a rule group to be started. The rule group identification "M" is applied to the decoder 17 to produce gate switching signals g1, g2 ... gM where only the signal gM is high "H" and other signals are low "L", so that the output BM from the rule group processor GRM is applied to the defuzzifier 4 through the gate GM opened by the signal gM (FIG. 1). As a result, in case of an emergency, the fuzzy rule group stored in the processor GRM is started to implement the control of the object. While the rule group processor GRM controls the object, the CPU 14 returns the sequence to STEP 1. This sequence will be repeated as long as there is an emergency. If the status is judged to be normal, viz. the data A1 is equal to or smaller than the limit level, the sequence from STEP1 moves to STEP2 in which the CPU 14 writes a value "1" into the group ID register 18. The output from the register 18 is applied to the decoder 17 to generate the gate signals g1, g2, ..., gM in which only the signal g1 is high "H", so that the output B1 from the rule group processor GR1 is applied to defuzzifier 4. As a result, the membership function B1 is defuzzified to produce a decided value e to be employed for an object control. Then, the sequence moves to STEP3 wherein the CPU 14 reads the data A from the latches L1, L2, ..., Lk. The read data A is weighted by CPU 14 until it reaches a first objective. During such weighting, the rule group processor GR1 controls the object through the defuzzifier by the fuzzy rules in the processor. If the data A representing the status of the object reaches the first objective, the sequence moves from STEP3 to STEP4. In STEP4, CPU 14 writes "2" into the group ID register 18, so that only the signal g2 is "H" and the output B2 is applied to the defuzzifier 4 through the gate G2 opened by the signal g2 to produce a defuzzified output or decided value e. During control of the object by the fuzzy rules stored in the processor GR2, the sequence performed by CPU 14 moves to STEP 5 wherein the CPU 14 reads the data A through latches L1, L2, ..., Lk and weights it until it reaches a second objective. If the data A reaches the second objective, the CPU 14 moves the sequence to STEP6. In a predetermined time set by the timer 7, the sequence from STEP6 moves to STEP1. Though the flow chart of FIG. 5 provides first and second objectives for the processors GR1 and GR2, it may be changed to provide a larger number of objectives, e.g. (M−1) objectives, corresponding to the processors GR1 to GR(M−1) if desired. Thus, according to the embodiment, the fuzzy rule groups are so selected to sequentially infer the entered data.

Herein, by way of example, the operation by the rule group processor GR1 will be explained next. (The same operation can be applied to any rule group processor GR1, GR2, ..., GRM through each fuzzy rule itself is different.) The fuzzy rule group GR1 includes N-number of fuzzy rule evaluation units R1, R2, ..., RN which receive the data A and infer it by the fuzzy rules stored in the units. The units R1, R2, ..., RN generate membership functions F1, F2, ..., FN to be applied to the CMAX circuit 2. The CMAX circuit 2 synthesizes the membership functions by the MAX circuits (FIG. 3) to generate an envelope curve output B1. Each fuzzy rule evaluation unit has the construction to FIG. 2 and implements evaluation by an antecedent and generation of an output membership function by a consequent in a fuzzy rule. The fuzzy rule evaluation unit Ri of FIG. 2 implements the following equation.

[antecedent] if $A1=LAB(i,1) \& A2=LAB(i,2) \& \ldots \& Ak=LAB(i,k)$

[consequent] then $B1=MFG(i)$ (1)

where A1, A2, ..., Ak are fuzzy variables, LAB (i,1), LAB(i,2), ..., LAB(i,k) are fuzzy labels, B1 is an output fuzzy variable, and MFG(i) is a membership function used in the consequent. In the fuzzy rule evaluation unit Ri, the MFC circuit MFC1 computes a belonging degree (membership value) to the fuzzy label LAB (i,1) about the fuzzy variable A1. The circuit MFCk computes a belonging degree to the fuzzy label LAB (i,k) about the fuzzy variable Ak. Thus computed belonging degrees are applied to the MIN circuit 10 which computes the minimum value among the belonging degrees to generate an output which is the value at the antecedent of the equation (1). The truncation circuit 12 truncates the membership function from the membership function generator 11 above the reference level generated from the MIN circuit 10 to produce a truncated membership function Fi.

Figure 6:
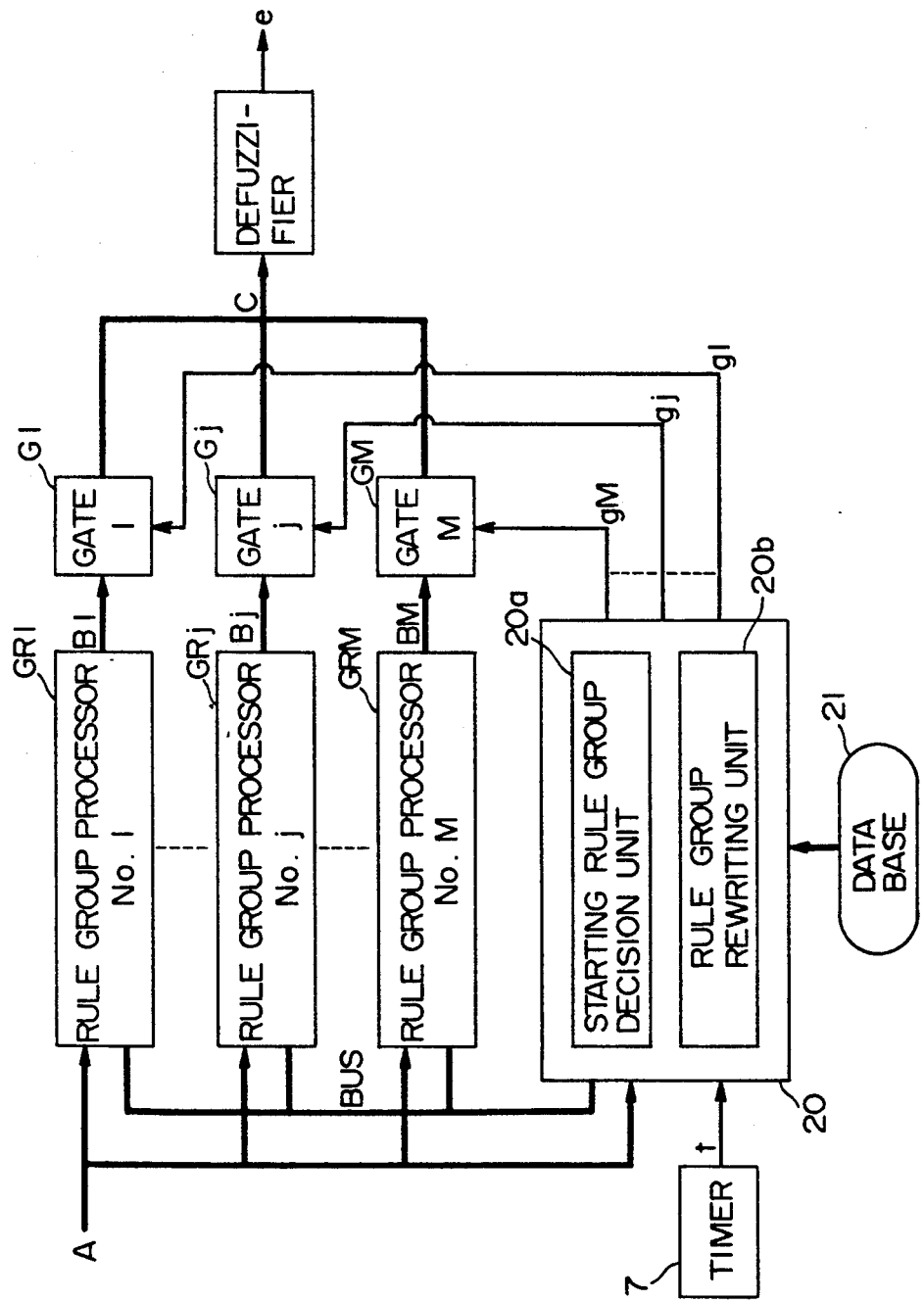
FIG. 6 is a schematic block diagram of a system including a fuzzy inference section and a switching device for switching fuzzy rule groups in the fuzzy inference section as a second embodiment of this invention.

Referring to FIG. 6, there is shown a second embodiment of a system according to this invention. The starting rule group decision unit 6 of FIG. 1 is replaced with a rule group controller 20 associated with a data base 21 storing rule groups in this embodiment.

The rule group controller 20 includes a starting rule group decision unit 20a and a rule group rewriting unit 20b, which is constructed by a microcomputer. The rule group rewriting unit 20b is disposed to access the rule group processors GR1, ..., GRj, ..., GRM for rewriting fuzzy rules and membership functions through a bus. The starting rule group decision unit 20a selects only one rule group processor GR1, ... GRj, ... or, GRM by opening only one gate G1, ..., Gj, ... or, GM as explained in the above-mentioned first embodiment of FIG. 1. If the gate G1 is open, other gates G2, ..., Gj, ... GM are closed so that other rule group processors than GR1 are not activated to implement any fuzzy inference.

Fuzzy rules and membership functions in the rule group processor not activated for a fuzzy inference in this embodiment are rewritten into a rule group and membership functions in the data base 21 by the rule group rewriting unit 20b. Such rewriting is performed based on a rule group change primary factor including status data about an object to be controlled and time elapsing data, and is executed by a rewriting execution program stored in a user program memory during the time when the selected rule group processor implements a fuzzy inference. The rewriting execution program is interpreted for execution by an interpreter disposed within an interpreter storage area in the rule group controller 20.

Figure 7:
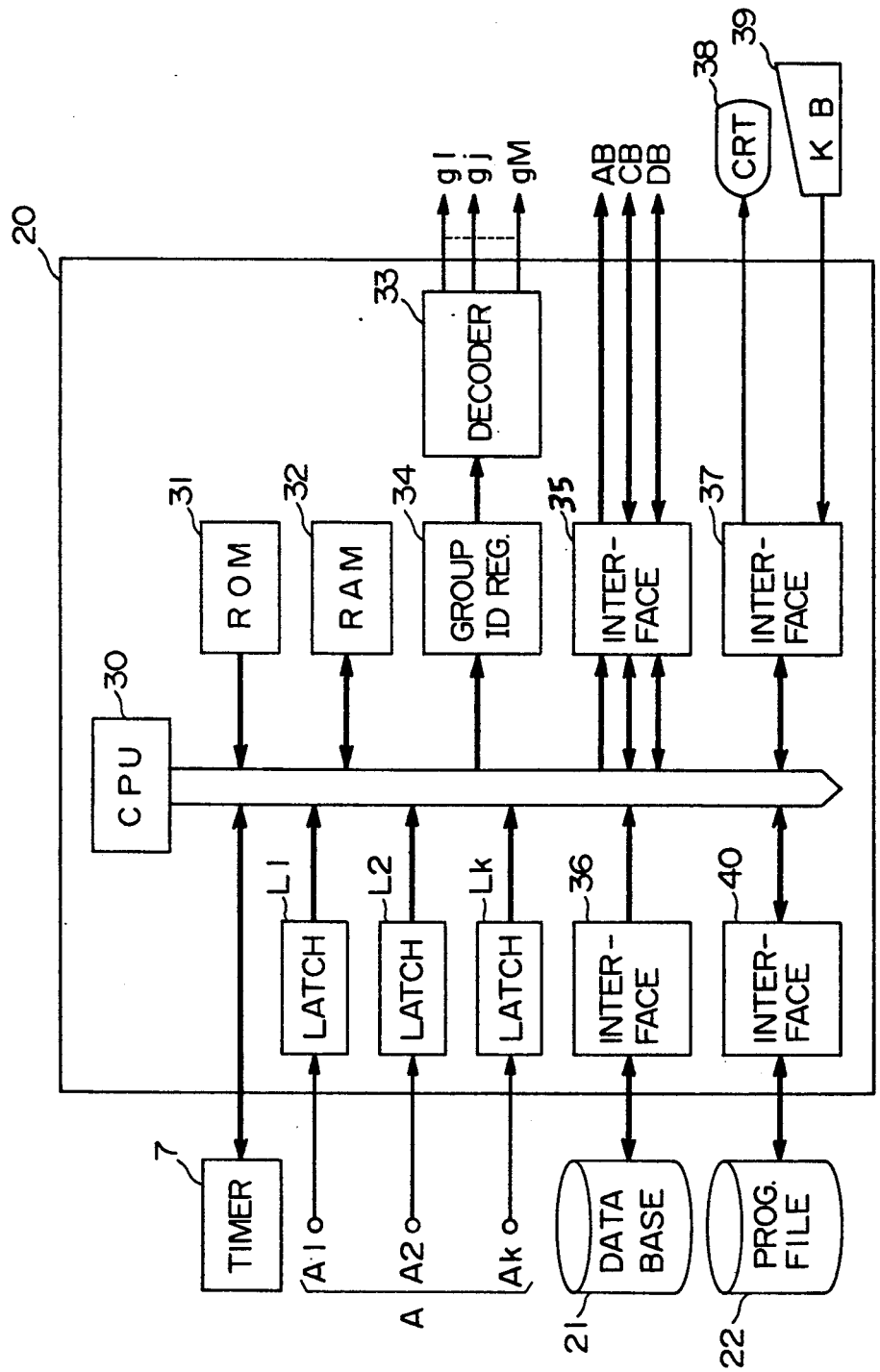
FIG. 7 is a schematic block diagram of a rule group controller employed in the system of FIG. 6.

In FIG. 7, there is shown a construction of the rule group controller 20. ROM 31 includes a system program storage area, interface program storage area, and an interpreter storage area. RAM 32 stores data for various objectives and user programs. Latches L1, L2, ..., Lk latches external data A (A1, A2, ..., Ak). A group ID register 34 is disposed to store the identification of a starting rule group for application to a decoder 33 generating gate switching signals g1, ..., gj, ..., gM of the gates G1, ..., Gj, ..., GM.

Figure 8:
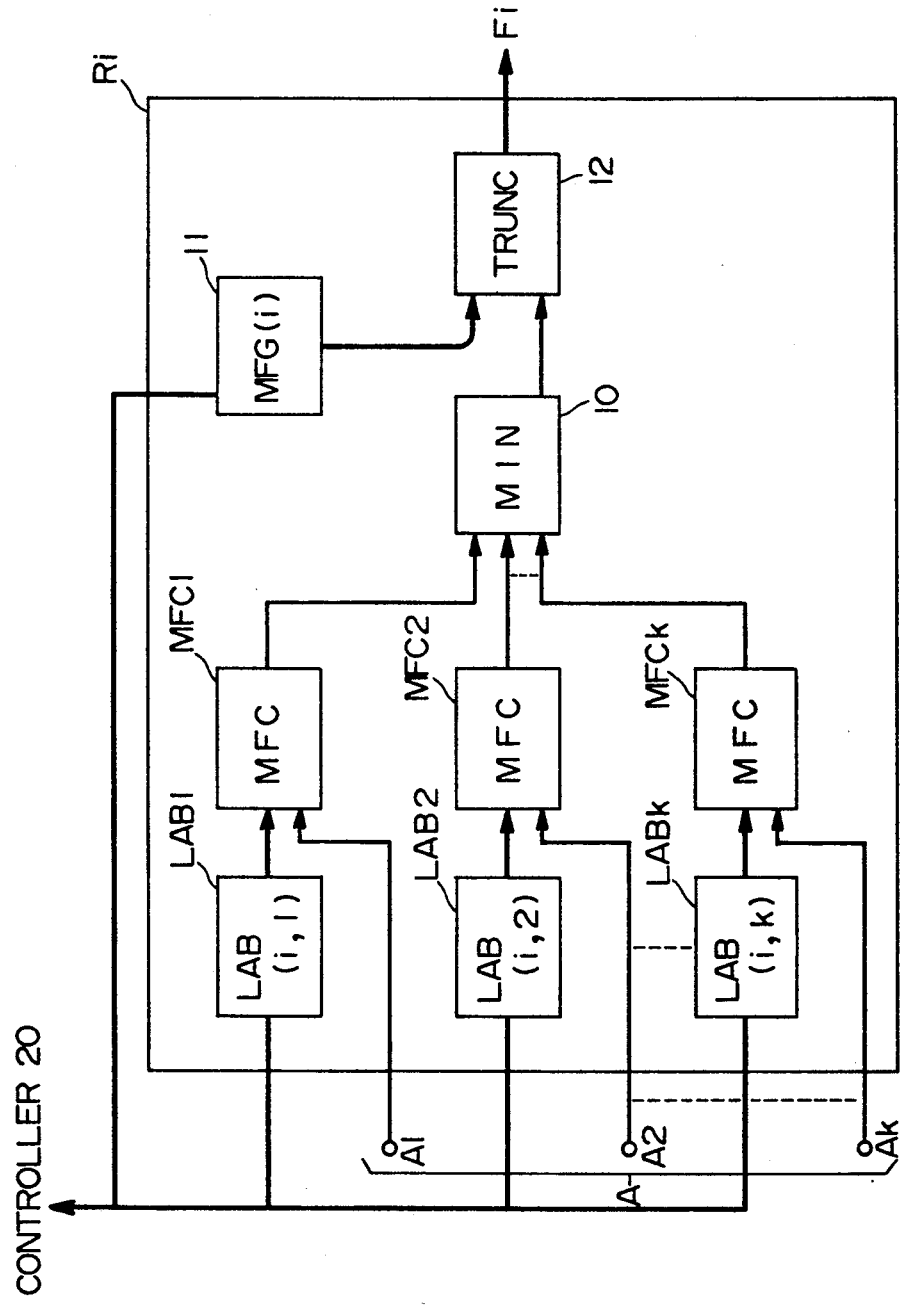
FIG. 8 illustrates bus lines connected between a fuzzy rule evaluation unit employed in a rule group processor and the rule group controller which are employed in the system of FIG. 6.

A rule group processor interface 35 connected with CPU 30 is associated with fuzzy rule evaluation units within each rule group processor to write data into label registers (LAB1 to LABk) and a membership function generator (MFG) 11 as shown in FIG. 8 illustrating a construction of a fuzzy rule evaluation unit (Ri).

An interface 36 is connected through the bus to the data base 21 to read rule data stored therein. An interface 37 is connected with the CPU 30 to receive program data stored in the user program storage area of the RAM 32, and further connected with a CRT display 38 and a keyboard 39 for editing programs. If desired, a user program file 22 and an interface 40 may be connected with CPU 30. The file 22 may be used as an additional memory for storing user programs to supplement the user program area of the RAM 32.

The interpreter stored in the ROM 31 has the following commands and their corresponding contents.

| [COMMAND] | [CONTENTS] |
| --- | --- |
| ENABLE ⊔ j | Open only the gate Gj and close other gates to apply the output from the rule group processor GRj |
| SET ⊔ h,j | Set No. h rule group stored in the rule group data base (21) into the rule group processor GRj |
| GOTO ⊔ STEP | Move the sequence to the command represented by number STEP |
| if (CONDITION) then (COMMAND) | If the condition is satisfied, the command should be executed. The command includes ENABLE, SET and GOTO texts. |
| TIMER 0 | Reset timer (7) |
| END | End the sequence |

In FIG. 9, there is shown a user program stored in the RAM 32 at its user program storage area by way of example, in which the function DIST(x,y) represents the distance between vectors x and y.

Referring to the user program of FIG. 9, the operation for rewriting the not-activated fuzzy rule groups during an inference operation will be described hereinafter.

(STEP001 to STEP004)

The CPU 30 reads rule groups 1 to 4 from the data base 21, and sets them into the rule group processors GR1 to GR4.

(STEP005)

The gate G1 corresponding to the processor GR1 is opened. In this step, the rule group within the rule group processor GR1 is decided to be started and selected, so that a fuzzy inference is implemented by the processor GR1.

(STEP006)

The CPU 30 reads an external input A from the latches L1 to Lk to be compared with a vector A0 representing a target of a control about an object. If the distance between the vectors A and A0 becomes shorter than θ, the sequence moves to STEP009.

(STEP007)

Unless the condition in STEP006 is satisfied, the sequence moves to STEP007 wherein the input A is compared with another target vector A1. If the distance is less than θ, the sequence moves to STEP013. Unless either condition in STEP006 or STEP007 is satisfied, the sequence moves to STEP008 and returns to STEP006 after execution of the GOTO command. Thus, as long as the status of the object is far from the target A0 and A1, the sequence repeats between STEP006 and STEP008. If the condition in STEP006 is satisfied, the sequence moves to STEP009.

(STEP009)

Only the gate G2 is opened, the fuzzy inference by the rule group processor GR2 is implemented. Thus, the rule group processor for implementation of the fuzzy inference changes from GR1 to GR2.

(STEP010)

The timer 7 is reset and starts timing.

(STEP011)

Timer data is read from the timer 7 to be compared with a threshold value T0. If a current time is over T0, the sequence goes to STEP001. Otherwise, it goes to STEP012 and returns to STEP011.

Thus, between STEP009 and STEP012 the rule group processor GR2 is involved into the fuzzy inference for a predetermined time period. After the predetermined time period elapses, the sequence returns to STEP001.

(STEP013 to STEP015)

These steps will be initiated if the condition in STEP007 is satisfied, and executed during the implementation of fuzzy inference by the rule group processor GR1 by STEP005. The three SET commands rewrite the fuzzy rule groups to "5", "6" and "7" in the processors GR2, GR3 and GR4. As described above referring to FIG. 8, the rewriting is executed by rewriting data into the respective label registers LAB1 to LABk and the membership function generator (MFG) 11 producing the consequent membership function in the respective rule group processors.

(STEP018)

The rule group processor GR2 is employed for implementing the fuzzy inference.

(STEP019)

If the data A becomes close to the target A2, the sequence moves to STEP001. Otherwise, it goes to STEP020 and returns to STEP019. Thus, until the status A of the object becomes close to A2, the rule group processor GR2 is involved into the fuzzy inference operation.

According to the above sample program, the rewriting operation from STEP013 to STEP015 is preformed during the actual fuzzy inference implementation by the processor GR1. That is, the rule group controller 20 monitors the status of the object to be controlled, and, if a predetermined status is found, rewrites the fuzzy rule group (non-activated rule group) in the non-activated rule group processor with the fuzzy rule group stored in the data base 21 for future use. Thus, seemingly, the time for changing the fuzzy rule group disappears or is very shortened, whereby the high speed operation in the fuzzy inference is maintained.

Figure 10:
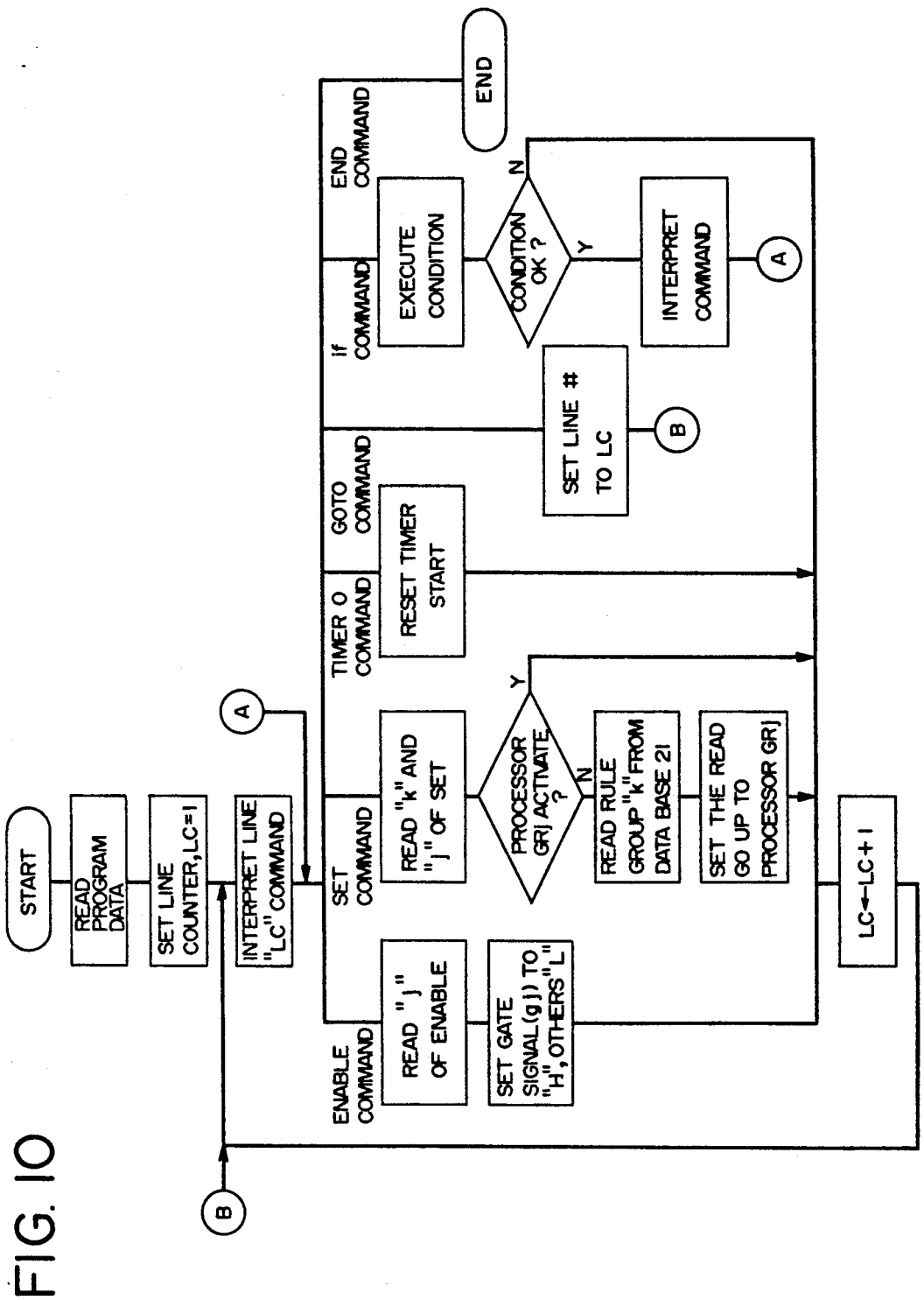
FIG. 10 is a flow chart illustrating an operation by the interpreter.

Referring to FIG. 10, there is shown a flow chart of an operation by the interpreter stored in ROM 31, which, by way of example, shows an operation for executing each command line in FIG. 9. The interpreter may use the common BASIC or other language, if desired.

Though the above embodiments employ fuzzy rules, the system according to this invention may be applied to an inference systems employing production rules represented by "if . . . then . . . " expressions.

What is claimed is:

1. A system for selecting one of a plurality of rule groups for use by an inference device which executes inference logic on applied input data, said system comprising:
   rule group decision means for receiving said applied input data and deciding, based on selection data which includes said applied input data, which of said plurality of rule groups is to be used as the rule group by said inference device; and
   selecting means responsive to said decision means for enabling said inference device to operate on said applied input data using the rule group decided by said decision means.

2. A system as in claim 1, wherein said applied input data represents a status of an object to be controlled by said inference device and said selection data further includes elapsing time data.

3. A system as in claim 1, wherein said rule group is a fuzzy logic rule group.

4. A system as in claim 1, wherein said decision means first receives said applied input data and decides, based on the content of said applied input data, which of said plurality of rule groups is to be initially used as a starting rule group by said inference device.

5. A system as in claim 1, wherein said inference device comprises a plurality of inference logic rule group processors, each comprising a plurality of rule evaluation units for applying a respective rule group to said applied input data and a plurality of switching gates respectively associated with each of said rule group processors, said decision means selecting one of said rule group processors and said selecting means being responsive to said decision means to enable that switching gate associated with the selected rule group processor.

6. A system as in claim 5, wherein said rule group rewriting means includes a user program memory for storing a program for rewriting a non-activated rule group, and an interpreter memory for storing an interpreter to interpret and execute said program.

7. A system as in claim 5, wherein each of said rule group processors includes a rule group storage area, said system further comprising means for rewriting new rule groups into rule group storage areas of said rule group processors.

8. A system as in claim 7, including means for performing said rewriting during the execution of inference logic by said inference device using a selected rule group processor.

9. A system as in claim 7, wherein said rule group rewriting means includes a user program memory for storing a program for rewriting non-activated rule groups, and an interpreter memory for storing an interpreter to interpret and execute said program.

10. A system as in claim 1, further comprising data storage means for storing said plurality of rule groups in group units and rule group rewriting means connected to said data storage means for rewriting new rule groups into said data storage means.

11. A system as in claim 10, including means for performing said rewriting during the execution of inference logic by said inference device using a selected rule group.

12. A system as in claim 10, wherein said rule group rewriting means includes a user program memory for storing a program for rewriting non-activated rule groups, and an interpreter memory for storing an interpreter to interpret and execute said program.

13. A system for selecting one out of a plurality of rule groups for use by an inference device, which executes inference logic on applied input data, said system comprising:
   rule group decision means including a central processing unit for determining, based on selection data which includes said applied input data, a rule group to be used by said inference device; and
   selecting means connected to said central processing unit and responsive to said decision means for enabling said selected rule group to be an active rule group which is used by said inference device on said applied input data.

14. A system as in claim 13, wherein said selecting means includes an active rule group identification register which is accessible by said central processing unit and means responsive to the content of said active rule group identification register for enabling said inference device to use said selected rule group;
   said central processing unit including means for changing the content of said identification register to thereby change the selected rule group used by said inference device.

15. A system as in claim 13, wherein said decision means includes means for receiving said applied input data and means for deciding, based on the content of said applied input data, which of said plurality of rule groups is to be initially used as a starting rule group by said inference device.

16. A system as in claim 13, wherein said inference device comprises a plurality of inference logic rule group processors, each comprising a plurality of rule evaluation units for applying a respective rule group to received input data and a plurality of switching gates respectively associated with said rule group processors, said decision means selecting one of rule group processors and said selecting means being responsive to said decision means to enable that switching gate associated with the selected rule group processor.

17. A system as in claim 16, wherein each of said rule group processors includes a rule group storage area, said system further comprising means for rewriting new rule groups into rule group storage areas of said rule group processors.

18. A system as in claim 17, including means for performing said rewriting during the execution of inference logic by said inference device using a selected rule group processor.

19. A system as in claim 17, wherein said rule group rewriting means includes a user program memory for storing a program for rewriting non-activated rule groups, and an interpreter memory for storing an interpreter to interpret and execute said program.

20. A system as in claim 13, further comprising data storage means for storing said plurality of rule groups in group units and rule group rewriting means connected to said data storage means for rewriting new rule groups into said storage means.

21. A system as in claim 20, including means for performing said rewriting during the execution of inference logic by said inference device using a selected rule group.

22. A system as in claim 20, wherein said rule group rewriting means includes a user program memory for storing a program for rewriting non-activated rule groups, and an interpreter memory for storing an interpreter to interpret and execute said program.

23. A system as in claim 13, wherein said applied input data represents a status of an object to be controlled by said inference device and wherein said selection data further includes elapsing time data.

24. A system as in claim 13, wherein said rule group is a fuzzy logic rule group.

* * * * *

UNITED STATES PATENT AND TRADEMARK OFFICE
CERTIFICATE OF CORRECTION

PATENT NO. : 5,165,011
DATED : November 17, 1992
INVENTOR(S) : Atsushi Hisano .

It is certified that error appears in the above-identified patent and that said Letters Patent is hereby corrected as shown below:

COLUMN 8

Claim 13, Line 1:

"A system for selecting one out of a plurality of" should read
--A system for selecting one of a plurality of--.

Signed and Sealed this

Fifth Day of July, 1994

Attest:

BRUCE LEHMAN

Attesting Officer         Commissioner of Patents and Trademarks